United States Patent
Spears

(10) Patent No.: US 8,388,026 B2
(45) Date of Patent: Mar. 5, 2013

(54) REPAIR COUPLING FOR PIPING SYSTEMS

(75) Inventor: Wayne Spears, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 13/154,115

(22) Filed: Jun. 6, 2011

(65) Prior Publication Data

US 2012/0306192 A1      Dec. 6, 2012

(51) Int. Cl.
*F16L 55/00*  (2006.01)

(52) U.S. Cl. .............. 285/15; 285/32; 285/302

(58) Field of Classification Search .............. 285/15, 285/145.1, 302, 298, 32
See application file for complete search history.

(56) References Cited

U.S. PATENT DOCUMENTS

| | | | | |
|---|---|---|---|---|
| 4,687,232 A * | 8/1987 | Zimmerman | ............. | 285/31 |
| 6,347,642 B1 * | 2/2002 | Schulte | ............. | 137/231 |
| 7,032,612 B2 * | 4/2006 | Shipman | ............. | 137/231 |

* cited by examiner

*Primary Examiner* — Aaron Dunwoody
(74) *Attorney, Agent, or Firm* — Sheldon Mak & Anderson

(57) ABSTRACT

A repair coupling for joining a first pipe with a second pipe includes (a) a hollow body having a first open end, a second open end, and a passageway the interior surface of the body defining a peripheral, helical body edge terminating in a body edge locking lug, and (b) a hollow tubular insert slidably disposed within the body, the tubular insert having a first open end and a second open end, the tubular insert defining a passageway he exterior surface of the tubular insert defining a peripheral, helical insert edge terminating in an insert edge locking lug. The tubular insert is slidable between (i) a first insert position wherein the helical insert edge is in contract with the helical body edge and (ii) a second insert position wherein the helical insert edge is spaced apart from the helical body edge.

7 Claims, 3 Drawing Sheets

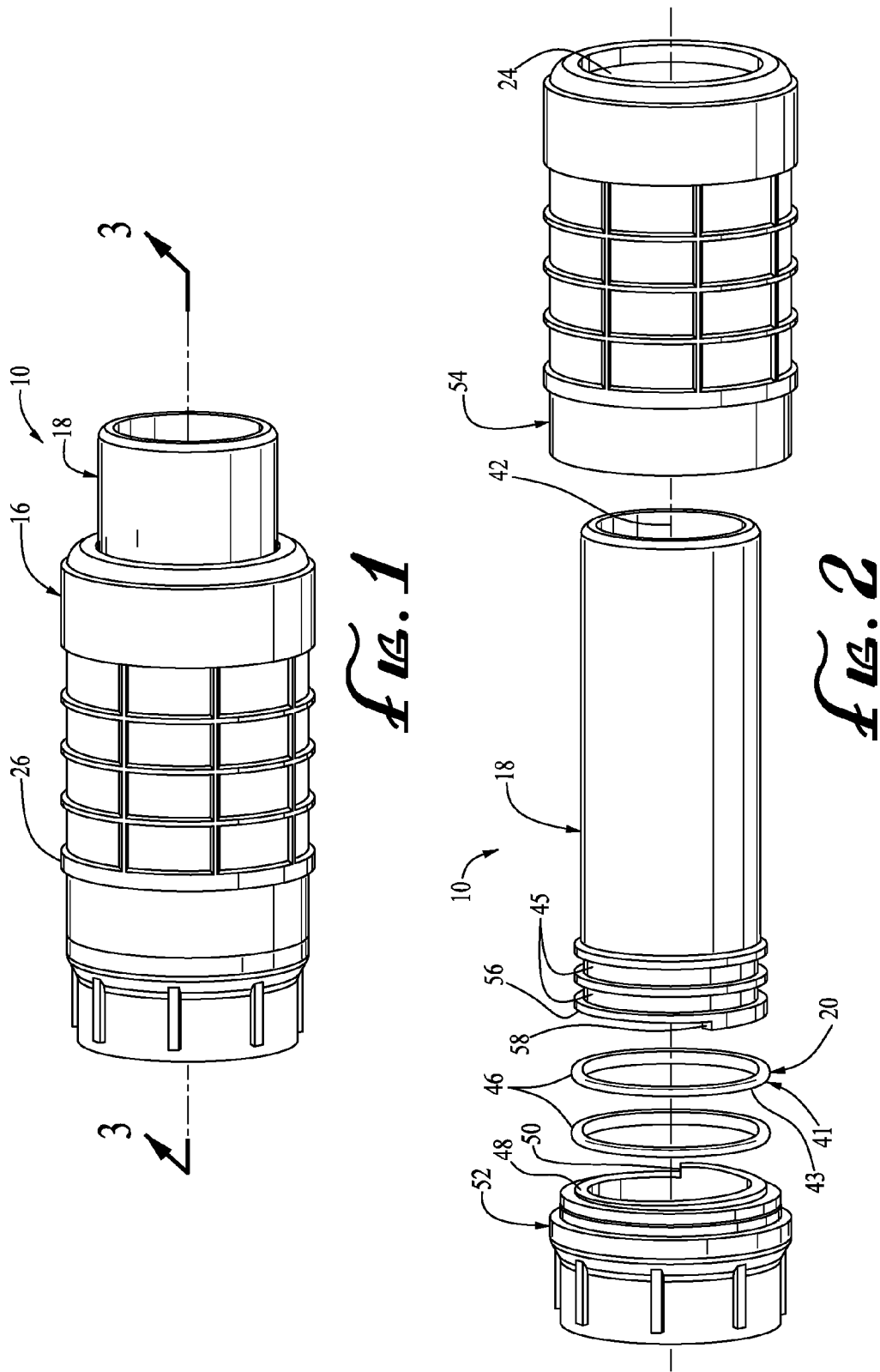

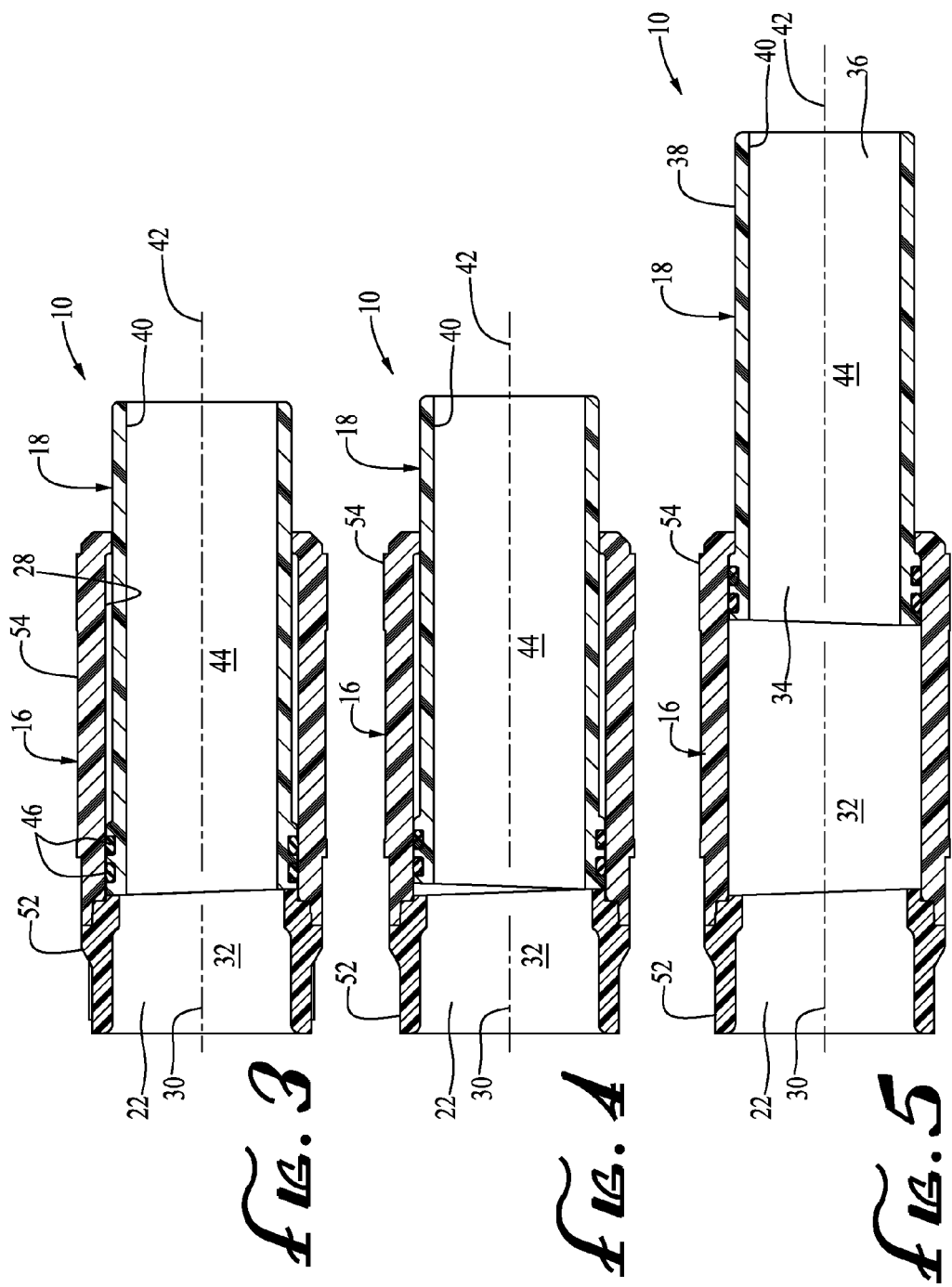

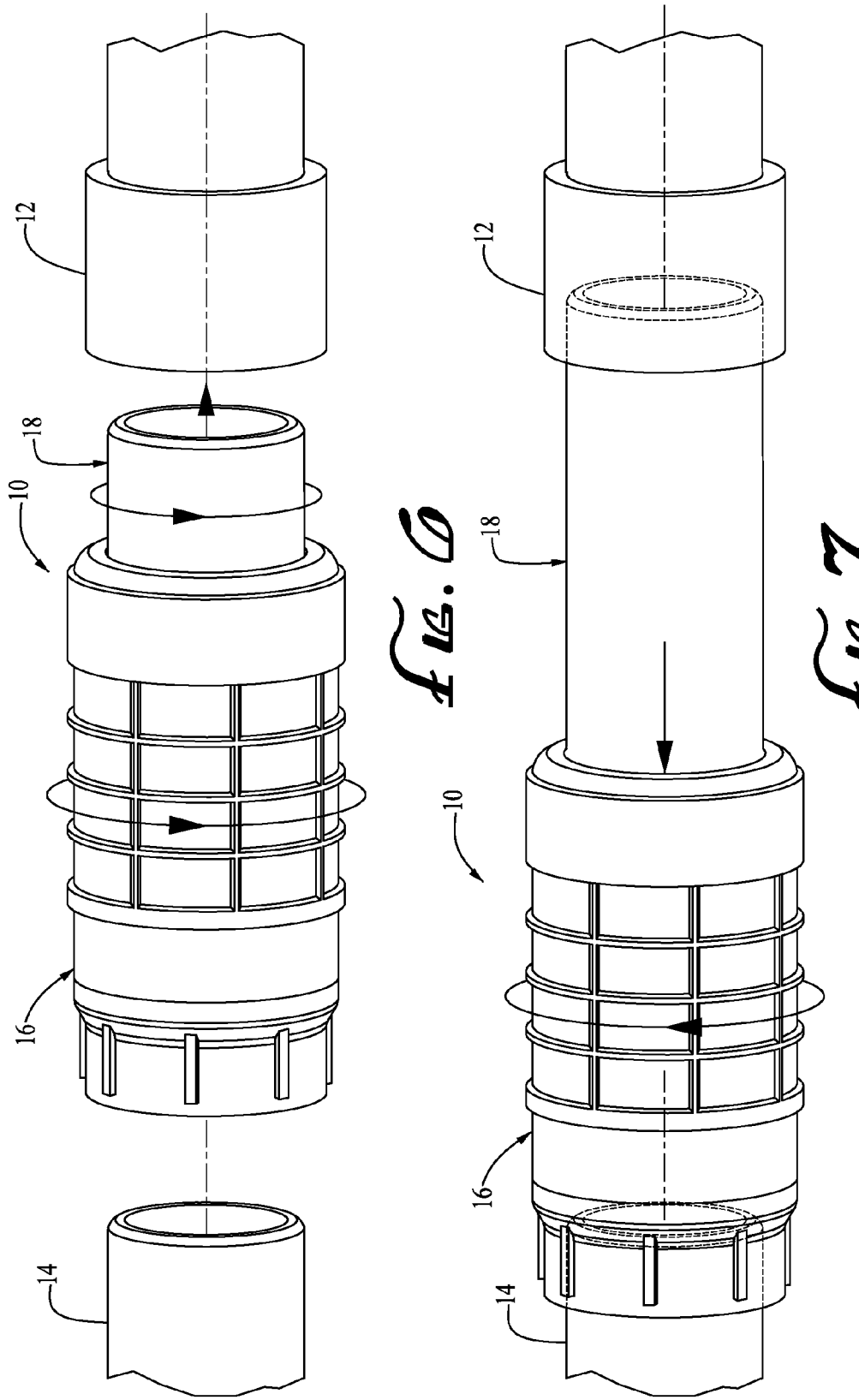

REPAIR COUPLING FOR PIPING SYSTEMS

FIELD OF THE INVENTION

This invention relates generally to piping systems and, more particularly, to repair couplings used in such piping systems.

BACKGROUND OF THE INVENTION

Repair couplings are used in the maintenance of piping systems to repair sections that may be damaged or otherwise need to be removed for some reason. Repair couplings are made to connect to the ends of pipes in a linear fashion.

Repair couplings are most common in the repair of PVC and other plastic pipes. PVC repair couplings are typically made with ends that can be solvent cemented to either sections of pipe or to fittings.

Repair couplings of the prior art are made with (i) an elongate, hollow body having a smooth bore and (ii) an interior tube slidably disposed in telescoping fashion within the smooth bore. O-rings are disposed around the circumference of the interior tube to seal the interior tube to the interior surface of the body, while allowing axial movement of the interior tube back and forth within the body. The interior surface of the body is lubricated to facilitate such axial movement.

One problem with repair couplings of the prior art arises after several weeks of storage, when the O-rings begin pushing through the lubricant, resulting in dry interference between the O-rings and the interior surface of the body. This makes it very difficult to axially slide the interior tube within the body.

A second problem with plastic repair couplings (such as PVC repair couplings) of the prior art arises in the welding process. In the welding process, after adhesive is applied to the exterior surface of the distal end of the interior tube, and after the distal end of the interior tube is inserted into the end of a pipe section, the interior tube must be turned at least one quarter turn within the pipe section to properly distribute adhesive between the interior tube and a pipe section. Since the body of the repair coupling surrounds much of the interior tube, and since the distal end of the interior tube is smooth, gripping the interior tube to effect the turning of the interior tube within the pipe section can be difficult.

Accordingly, there is a need for a repair coupling which avoids the aforementioned problems in the prior art.

SUMMARY OF THE INVENTION

The invention satisfies this need. The invention is a repair coupling suitable for joining a first pipe in fluid tight communication with a second pipe. In the invention, the repair coupling comprises (a) a hollow body having a first open end, a second open end, an exterior surface, an interior surface and a longitudinal axis, the body defining a linear passageway between the first open end of the body and the second end of the body, the linear passageway having an interior diameter, the interior surface of the body, proximate to the first open of the body, defining a peripheral, helical body edge terminating in a body edge locking lug, (b) a hollow tubular insert slidably disposed within the body, the tubular insert having a first open end, a second open end, an exterior surface, an interior surface, an external diameter and a longitudinal axis, the tubular insert defining a linear passageway between the first open end of the tubular insert and the second open end of the tubular insert, the exterior surface of the tubular insert defining a peripheral, helical insert edge terminating in an insert edge locking lug, and (c) means for sealing the exterior surface of the tubular insert with the interior surface of the body. In the invention, the tubular insert is slidable between (i) a first insert position wherein the helical insert edge is in contract with the helical body edge and (ii) a second insert position wherein the helical insert edge is spaced apart from the helical body edge. When the insert is in the first insert position, the rotation of the body in a first direction causes the body edge locking lug to engage the insert edge locking lug (and to thereby rotate the tubular insert), and the rotation of the body in a direction opposite to the first direction causes the tubular insert to travel towards the second open end of the body.

DRAWINGS

These and other features, aspects and advantages of the present invention will become better understood with reference to the following description, appended claims and accompanying drawings where:

FIG. 1 is a perspective view of a repair coupling having features of the invention;

FIG. 2 is an exploded perspective view of the repair coupling illustrated in FIG. 1;

FIG. 3 is a cross-sectional side view of the repair coupling illustrated in FIG. 1, the coupling disposed in a first position;

FIG. 4 is a cross-sectional side view of the repair coupling illustrated in FIG. 1, the coupling disposed in a second position;

FIG. 5 is a cross-sectional side view of the repair coupling illustrated in FIG. 1, the coupling disposed in a third position;

FIG. 6 is a perspective view of the repair coupling illustrated in FIG. 1, showing the initial stages of using the repair coupling to connect a first pipe with a second pipe; and FIG. 7 is a perspective view of the repair coupling illustrated in FIG. 1 showing the latter stages of using the repair coupling to connect a first pipe 12 with a second pipe 14.

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a repair coupling 10 suitable for joining a first pipe 12 in fluid tight communication with a second pipe 14. The repair coupling 10 comprises a hollow body 16, a hollow tubular insert 18 and means 20 for sealing the tubular insert 18 with the body 16. One embodiment of the invention is illustrated in the drawings.

The body 16 has a first open end 22, a second open end 24, an exterior surface 26, an interior surface 28 and a longitudinal axis 30. The body 16 defines a linear passageway 32 between the first open end 22 of the body 16 and the second open end 24 of the body 16. The linear passageway 32 has an interior diameter.

The tubular insert 18 is slidably disposed within the body 16. The tubular insert 18 has a first open end 34, a second open end 36, an exterior surface 38, an interior surface 40, an external diameter and a longitudinal axis 42. The tubular insert 18 defines a linear passageway 44 between the first open end 34 of the tubular insert 18 and the second open end 36 of the tubular insert 18.

As illustrated in FIG. 2, the means 20 for sealing the exterior surface 38 of the tubular insert 18 with the interior surface 28 of the body 16 can comprise a sealing element 41 such as at least one circular gasket 43 disposed within a circumferential groove 45 in the exterior surface 38 of the tubular insert 18. Typically, such at least one gasket 43 comprises one or more O-rings 46 disposed around the exterior surface 38 of the tubular insert 18.

Proximate to the first open end 22 of the body 16, the interior surface 28 of the body 16 defines a peripheral helical body edge 48 terminating in a body edge locking lug 50.

In the embodiment illustrated in the drawings, the body 16 comprises a proximal portion 52 welded to a distal portion 54. The distal edge of the proximal portion 52 defines the helical body edge 48 and the body edge locking lug 50.

The exterior surface 38 of the tubular insert 18 defines a peripheral helical insert edge 56 terminating in an insert locking lug 58. The peripheral helical insert edge 56 is located and dimensioned to line up with, and make contact with, the helical body edge 48.

The tubular insert 18 is slidable within the hollow body 16 between (i) a first insert position wherein the helical insert edge 56 is in contract with the helical body edge 48, and (ii) a second insert position wherein the helical insert edge 56 is spaced apart from the helical body edge 48.

When the tubular insert 18 is in the first insert position, the rotation of the body 16 in a first direction causes the body edge locking lug 50 to engage the insert edge locking lug 58 and to thereby rotate the tubular insert 18 (as illustrated in FIG. 6), and the rotation of the body 16 in a direction opposite to the first direction causes the tubular insert 18 to travel towards the second open end 24 of the body 16 (as illustrated in FIG. 4).

In the first insert position, the helical insert edge 56 typically contacts about 0.125 inches of the helical body edge 48.

In the embodiment illustrated in the drawings, the helical body edge 48 and the helical insert edge 56 each define a continuous curve, and, in the first insert position, contact each other over about 270°-360° of their respective circumferences. In other embodiments, one or both of the helical edges 48 and 56 can define discontinuous curves comprising rising portions and non-rising portions.

In all cases, the interaction of the helical edges 48 and 56 preferably provide a thrust of the tubular insert 18 toward the second open end 24 of the body 16 of at least about 0.125 inches by the rotation of the helical insert edge 56 while in contact with the helical body edge 48. Helixes 48 and 56 of insufficient size will not provide enough thrust to roll lube under the O-ring.

The invention is installed in the following sequence:

1. As illustrated in FIG. 6, in its collapsed position (i.e., freshly out of storage) and with the locking lugs 50 and 58 engaged, cement is applied to the exterior surface 38 of the second end 36 of the tubular insert 18. Cement is also applied to the inner surface of a male open end of the first pipe 12. The second end 36 of the tubular insert 18 is then inserted into the end of a first pipe 12 and the body 16 is rotated ¼ turn in a direction wherein the locking lugs 50 and 58 remain engaged (so that the rotation of the body 16 rotates the tubular insert 18 one quarter turn within the end of the first pipe 12), thereby completing the weld of the tubular insert 18 to the end of the first pipe 12.

2. As illustrated in FIG. 7, once the tubular insert 18 is securely welded to the first pipe 12, the body 16 is rotated in a direction opposite to the direction rotated in step 1, above, so as to engage the opposed helical surfaces 48 and 56—thereby forcing the body 16 to axially travel with respect to the tubular insert 18 in a direction away from the first pipe 12.

3. (Once the body 16 has traveled in a direction away from the first pipe 12, the O-rings 46 surrounding the inner shaft pick up sufficient lubrication to allow the body 16 to freely slide over the tubular insert 18 further away from the first pipe 12 in the direction of the end of a second pipe 14.)

4. Cement is then applied to the exterior surface of a male open end of the second pipe 14, and cement is applied to the interior surface 28 of the first open end 22 of the body 16.

5. Finally, the body 16 is rotated (in any direction) ¼ turn to complete the weld of the body 16 to the end of the second pipe 14.

The invention provides a repair coupling which avoids problems in the prior art. With a repair coupling of the invention, repair couplings many weeks in age can be quickly and easily assembled into place without difficulties caused by dry interference between the O-rings and the interior surface of the body. Also, with repair couplings of the invention, the welding of the tubular end to a section of pipe is easily accomplished because the rotation of the tubular insert within the pipe is easily effected by rotation of the body.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A repair coupling suitable for joining a first pipe in fluid tight communication with a second pipe, the repair coupling comprising:
   (a) a hollow body having a first open end, a second open end, an exterior surface, an interior surface and a longitudinal axis, the body defining a linear passageway between the first open end of the body and the second end of the body, the linear passageway having an interior diameter, the interior surface of the body, proximate to the first open end of the body, defining a peripheral, helical body edge terminating in a body edge locking lug;
   (b) a hollow tubular insert slidably disposed within the body, the tubular insert having a first open end, a second open end, an exterior surface, an interior surface, an external diameter and a longitudinal axis, the tubular insert defining a linear passageway between the first open end of the tubular insert and the second open end of the tubular insert, the exterior surface of the tubular insert defining a peripheral, helical insert edge terminating in an insert edge locking lug; and
   (c) a sealing element for sealing the exterior surface of the tubular insert with the interior surface of the body;
   wherein the tubular insert is slidable between (i) a first insert position wherein the helical insert edge is in contract with the helical body edge, and (ii) a second insert position wherein the helical insert edge is spaced apart from the helical body edge; and
   wherein, when the insert is in the first insert position, the rotation of the body in a first direction causes the body edge locking lug to engage the insert edge locking lug and to thereby rotate the tubular insert, and the rotation of the body in a direction opposite to the first direction causes the tubular insert to travel towards the second open end of the body.

2. The repair coupling of claim 1 wherein the helical insert edge is sized and dimensioned to engage between about 270° and about 360° of the helical body edge.

3. The repair coupling of claim 1 wherein, when the insert is in the first insert position, the rotation of the body in a first direction causes the body edge locking lug to engage the insert edge locking lug and to thereby rotate the tubular insert, and the rotation of the body in a direction opposite to the first direction causes the tubular insert to travel towards the second open end of the body a distance of at least about 0.125 inches.

4. The repair coupling of claim 1 wherein the body comprises a proximal portion and a distal portion.

5. The repair coupling of claim 4 wherein the proximal portion is welded to the distal portion.

6. The repair coupling of claim 1 wherein the sealing element comprises at least one circular gasket disposed within a circumferential groove in the exterior surface of the tubular insert.

7. The sealing element of claim 6 wherein the at least one gasket is one or more O-rings.

* * * * *